(12) United States Patent
Johnston

(10) Patent No.: US 11,632,243 B1
(45) Date of Patent: Apr. 18, 2023

(54) MULTI-KEY EXCHANGE

(71) Applicant: Juniper Networks, Inc., Sunnyvale, CA (US)

(72) Inventor: Anna M. Johnston, Vancouver, WA (US)

(73) Assignee: Juniper Networks, Inc., Sunnyvale, CA (US)

( * ) Notice: Subject to any disclaimer, the term of this patent is extended or adjusted under 35 U.S.C. 154(b) by 262 days.

(21) Appl. No.: 16/836,635

(22) Filed: Mar. 31, 2020

(51) Int. Cl.
H04L 29/06 (2006.01)
H04L 9/08 (2006.01)
H04L 9/30 (2006.01)
H04L 9/14 (2006.01)

(52) U.S. Cl.
CPC .......... H04L 9/0861 (2013.01); H04L 9/085 (2013.01); H04L 9/14 (2013.01); H04L 9/3033 (2013.01)

(58) Field of Classification Search
CPC ......... H04L 9/0861; H04L 9/085; H04L 9/14; H04L 9/3033
See application file for complete search history.

(56) References Cited

U.S. PATENT DOCUMENTS

| | | | | |
|---|---|---|---|---|
| 6,076,078 A * | 6/2000 | Camp | ............... | G06Q 20/3827 705/76 |
| 6,282,295 B1 * | 8/2001 | Young | ............... | H04L 9/3218 380/30 |
| 6,636,968 B1 * | 10/2003 | Rosner | ............... | H04L 9/0833 713/178 |
| 7,136,489 B1 * | 11/2006 | Madhusudhana | ..... | H04L 9/3218 380/278 |
| 9,917,694 B1 * | 3/2018 | Juels | ............... | H04L 9/0861 |
| 2001/0055388 A1 * | 12/2001 | Kaliski, Jr. | ............. | H04L 9/085 713/155 |
| 2005/0195975 A1 * | 9/2005 | Kawakita | ............... | H04L 9/3236 380/30 |
| 2005/0276416 A1 * | 12/2005 | Zhu | ............... | H04N 21/26613 348/E7.056 |
| 2006/0062384 A1 * | 3/2006 | Dondeti | ............... | H04L 9/0816 380/283 |
| 2007/0174626 A1 * | 7/2007 | Huh | ............... | H04L 9/3247 713/180 |
| 2009/0167535 A1 * | 7/2009 | Sanchez | ............... | H04L 9/0825 340/573.1 |
| 2010/0122088 A1 * | 5/2010 | Oxford | ............... | H04L 63/0478 380/278 |
| 2010/0287366 A1 * | 11/2010 | Araki | ............... | H04L 9/085 713/150 |

(Continued)

FOREIGN PATENT DOCUMENTS

CN 107204851 A * 9/2017
CN 110213299 A * 9/2019
(Continued)

*Primary Examiner* — John B King
(74) *Attorney, Agent, or Firm* — Harrity & Harrity, LLP

(57) ABSTRACT

A first device may determine a prime integer for generating public keys, wherein the prime integer is based on a set of distinct prime integers. The first device may generate a set of multiple public keys based on a set of secret keys. The first device may combine the set of multiple public keys into a single value based on the prime integer and the set of distinct prime integers. The first device may transmit the single value to a second device.

20 Claims, 10 Drawing Sheets

(56) References Cited

U.S. PATENT DOCUMENTS

| | | | | |
|---|---|---|---|---|
| 2011/0126291 A1* | 5/2011 | Araki | ............ | H04L 9/085 |
| | | | | 726/26 |
| 2011/0130121 A1* | 6/2011 | Patel | ............ | H04W 12/082 |
| | | | | 455/411 |
| 2015/0222517 A1* | 8/2015 | McLaughlin | ....... | H04L 63/0435 |
| | | | | 713/171 |
| 2015/0222604 A1* | 8/2015 | Ylonen | ............ | H04L 9/3263 |
| | | | | 713/171 |
| 2016/0261409 A1* | 9/2016 | French | ............ | H04L 9/3234 |
| 2017/0048209 A1* | 2/2017 | Lohe | ............ | H04L 9/14 |
| 2019/0312720 A1* | 10/2019 | Liu | ............ | H04L 9/0861 |
| 2019/0332774 A1* | 10/2019 | Nix | ............ | H04W 12/06 |
| 2020/0012527 A1* | 1/2020 | Hartsock | ............ | H04L 9/0825 |
| 2020/0162269 A1* | 5/2020 | Nix | ............ | H04L 9/3252 |
| 2020/0252211 A1* | 8/2020 | Chen | ............ | H04L 9/0869 |
| 2021/0218560 A1* | 7/2021 | Nix | ............ | H04L 9/14 |

FOREIGN PATENT DOCUMENTS

| | | | | | |
|---|---|---|---|---|---|
| CN | 110417781 | A | * | 11/2019 | ............ G06F 21/602 |
| DE | 102016012189 | B4 | * | 2/2020 | ............ H04L 63/061 |
| JP | 2000066589 | A | * | 3/2000 | ............ H04L 9/085 |
| WO | WO-2021145874 | A1 | * | 7/2021 | |

* cited by examiner

MULTI-KEY EXCHANGE

BACKGROUND

Discrete logarithm based cryptosystems, such as digital signature algorithm (DSA), Diffie-Hellman, Menezes-Qu-Vanstone (MQV), ElGamal, and/or the like may be based on a multiplicative subgroup of a finite field or some alternative group (e.g., an elliptic curve group). In these discrete logarithm based cryptosystems, a device may use a private (e.g., secret) key to generate a public key for exchange with one or more other devices. In some discrete logarithm based cryptosystems, a first device may use a public key from a second device to determine a shared secret (e.g., a shared key) for encrypting and/or decrypting communications between the first device and the second device.

SUMMARY

According to some implementations, a method may include generating, by a first device, a set of multiple public keys based on a set of secret keys; combining, by the first device, the set of multiple public keys into a single value based on a set of prime integers; and transmitting, by the first device, the single value to a second device.

According to some implementations, a first device may include one or more memories and one or more processors. In some implementations, the one or more processors are communicatively coupled to the one or more memories. The one or more processors may be configured to: generate a first single value, that includes a set of multiple public keys, based on a set of prime integers and a set of secret keys; transmit the first single value to a second device; receive a second single value from the second device; and determine a set of shared secrets based on the second single value and the first value.

According to some implementations, a non-transitory computer-readable medium may store one or more instructions. The one or more instructions, when executed by one or more processors of a first device, may cause the one or more processors to: generate a single value, that includes a set of multiple public keys, based on a set of prime integers and a set of secret keys; transmit the single value to a set of devices; receive a set of additional single values from the set of devices; and determine a set of shared secrets, with devices of the set of devices, based on the set of additional single values and the single value.

DETAILED DESCRIPTION OF PREFERRED EMBODIMENTS

The following detailed description of example implementations refers to the accompanying drawings. The same reference numbers in different drawings may identify the same or similar elements.

Devices may perform a key exchange to determine a shared secret. The devices may use the shared secret to encrypt and/or decrypt messages between the devices. For security, public keys (e.g., the keys used in the key exchange) associated with finite field may have a large field size compared to the required size of each subgroup. Exchanging public keys with a large field size may consume communication resources to support transmission of a relatively large message. Additionally, if the public key were to change, or if a device were to exchange public keys with multiple devices, the device would need to communicate multiple large messages with the large field size.

In some implementations described herein, a first device may use a finite field based system to transmit and/or store multiple public keys with a single finite field element. In some implementations, a first device may determine a set of prime integers for a key exchange protocol, with the set of prime integers containing a prime for the finite field and a prime for each subgroup. The first device may generate (e.g., using one or more generator integers) a set of multiple public keys based on a set of secret keys and prime integers of the first device. The first device may combine the set of multiple public keys (e.g., using a modulo function) based on the set of prime integers. The first device may transmit the single value to a second device and/or one or more additional devices. The second device may extract one or more public keys from the single value based on the set of prime integers, and a set of secret keys of the second device.

In this way, the first device may transmit multiple public keys (e.g., to the second device and/or additional devices) with a single transmission. This may conserve computing, communication, and/or network resources that may otherwise be used to transmit each of the multiple public keys separately.

FIGS. 1A-1E are diagrams of an example implementation 100 described herein. As shown in FIGS. 1A-1E, example implementation 100 includes a first device that generates a set of multiple public keys, combines the set of multiple public keys into a single value, and transmits the single value to a second device and/or one or more additional devices.

Figure 1A:
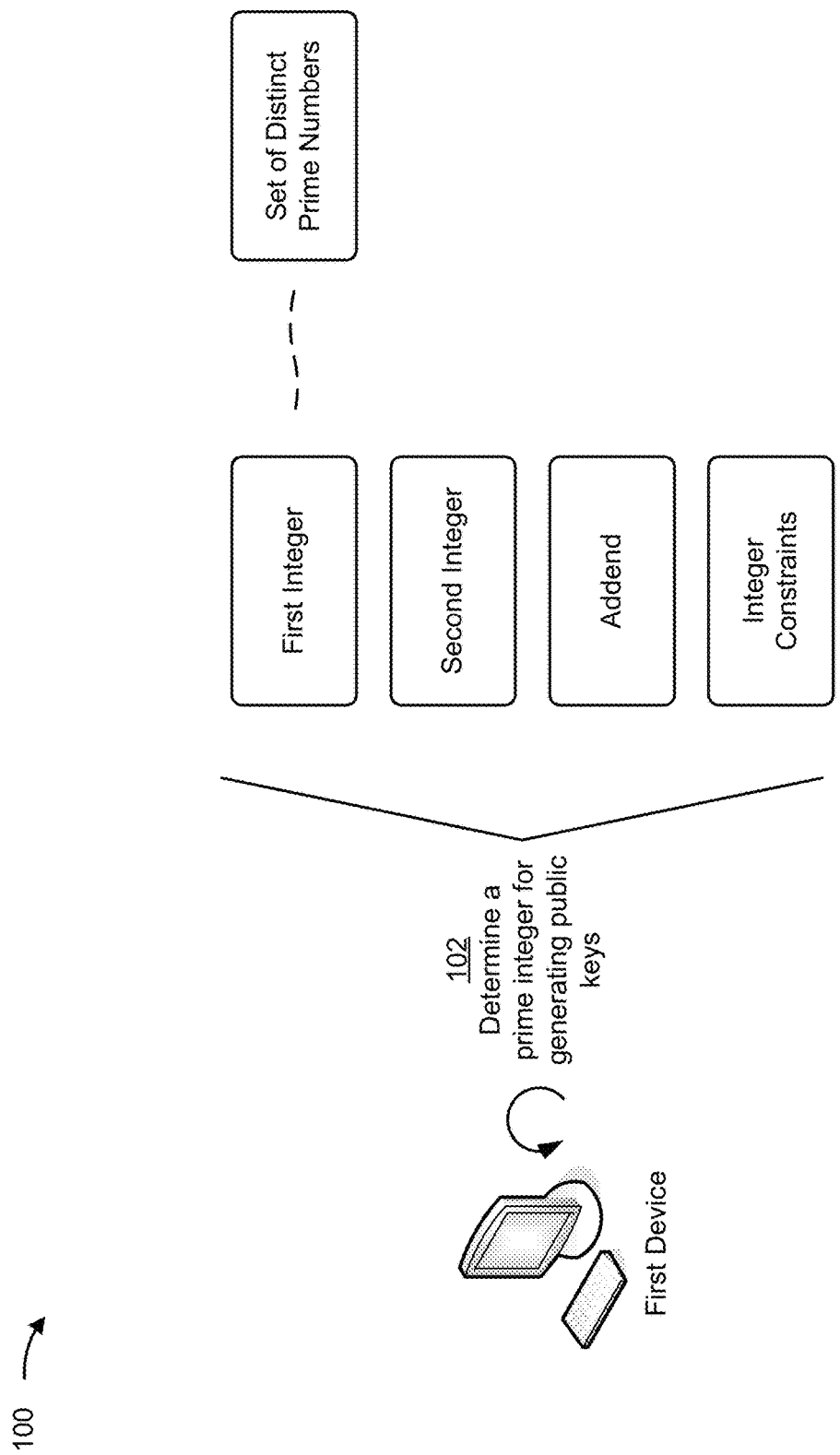
FIGS. 1A-1E are diagrams of an example implementation described herein.

As shown in FIG. 1A, and by reference number 102, the first device may determine a set of prime integers for public key protocols. The device may determine the set of prime integers such that one prime in the set is divisible by all the other primes in the set. In some implementations, the prime integers may be based on Equation 1 and Equation 2, below:

$$(P-1)=hQ \quad \text{(Equation 1)}$$

$$Q=\Pi_{i=1}^{n} q_i \quad \text{(Equation 2)}$$

where P is the prime integer for the field, h is an integer bound by the integer constraints (e.g., used for sizing P, based on security standards, user requirements, and/or the like), and $\{q_1, q_2, q_3, \ldots q_n\}$ is a set of n distinct prime integers all sized for appropriate security which determine the subgroups.

Figure 1B:
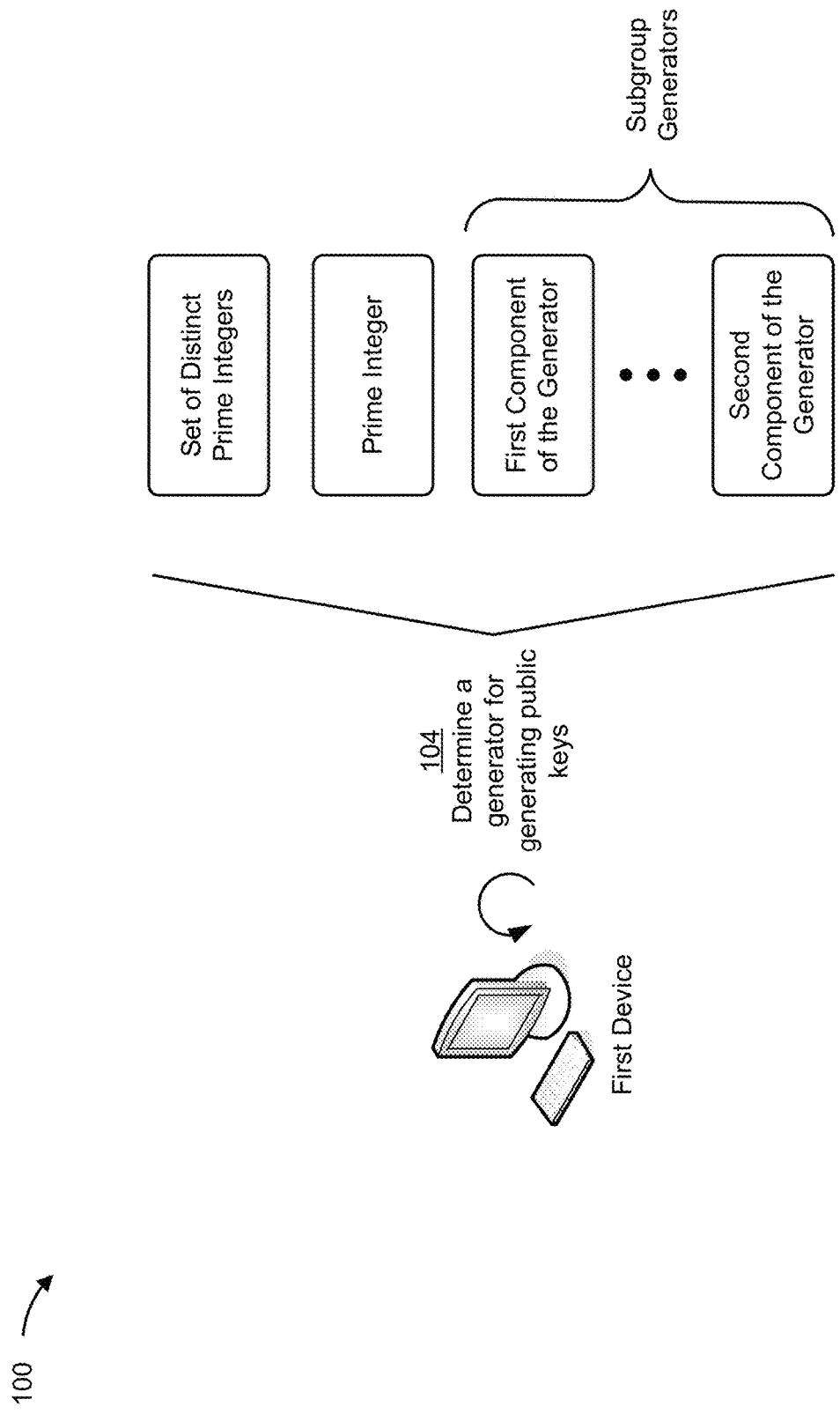

As shown in FIG. 1B, and by reference number 104, the first device may determine a generator for generating public keys. In some implementations, the first device may determine the generator or generators based on the set of prime integers (e.g., a prime integer for the field and one or more of the smaller prime integers or the product of some subset of these integers). In some implementations, the generator may include one or more components for generating a set of public keys (e.g., a set of multiple public keys). In some implementations, the set of components may be based on the generators and the set of prime integers. In some implementations, the group generator g may be based on Equation 3, below:

$$g^Q = 1 \bmod P \quad \text{(Equation 3)}$$

where $1<g<P$, $g^x \not\equiv 1 \bmod P$ for all $0<x<Q$ and $g^Q \equiv 1 \bmod P$, where x is a secret key or a set of secret keys. The subset generators $g_i$ derived from the generator g may be based on Equation 4, below:

$$g_i = g^{Q/q_i} \bmod P, \text{ for } 1 \leq i \leq n \quad \text{(Equation 4)}$$

Some discrete logarithm based public key systems use an element of a prime ordered subgroup. In some implementations, the element of the prime ordered subgroup may be any of the components $g_i$ of the generator.

Figure 1C:
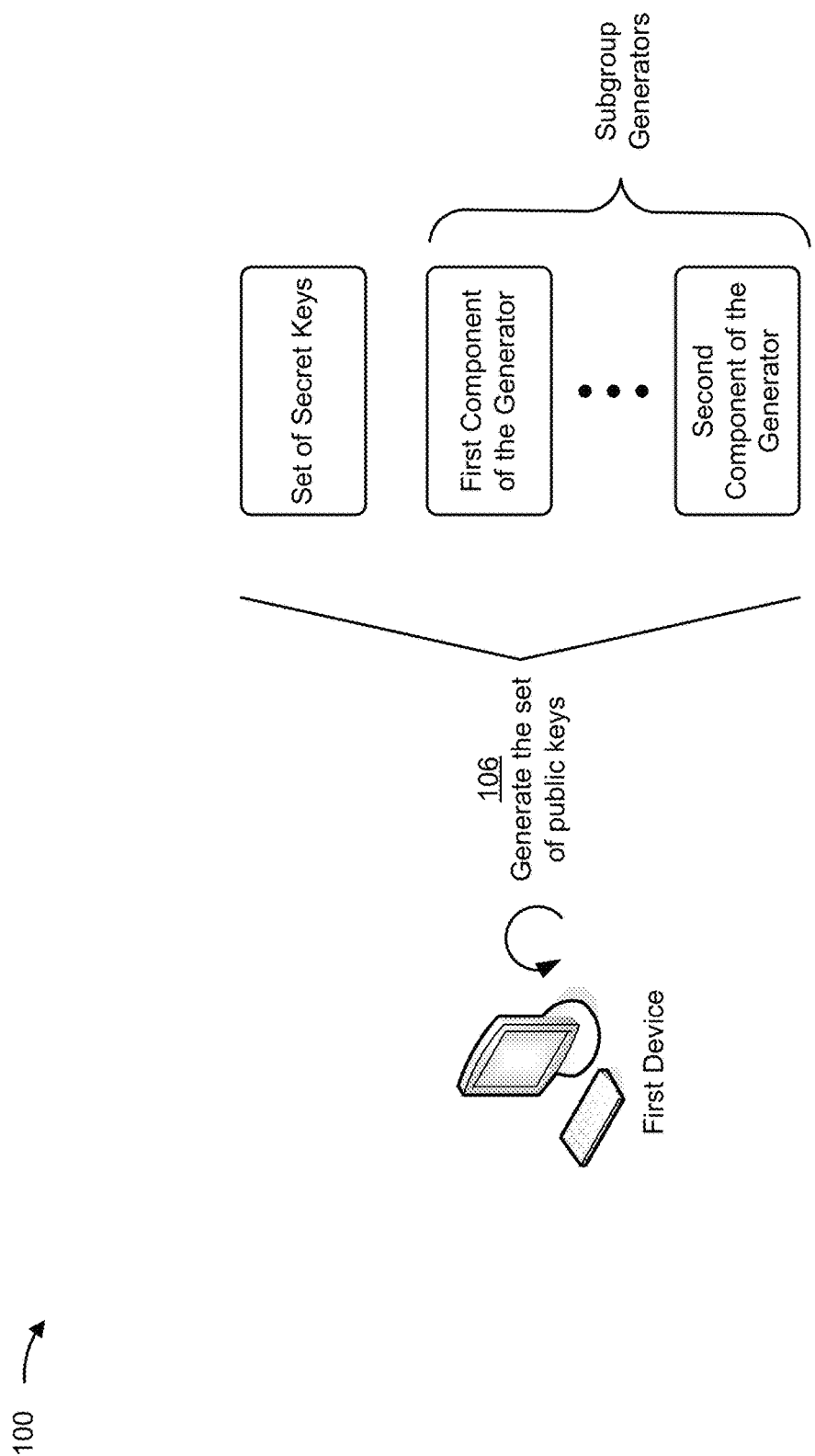

As shown in FIG. 1C, and by reference number 106, the first device may generate the set of public keys. In some implementations, the first device may generate the set of public keys based on a set of secret keys, the subgroup generators, and/or the like. In some implementations, the set of multiple public keys is based on exponentiations of the subgroup generators by the set of secret keys. In some implementations, the components $y_i$ set of public keys y may be based on Equation 5, below:

$$y_i = g_i^{x_i}, \text{ for } 1 \leq i \leq n \quad \text{(Equation 5)}$$

Figure 1D:
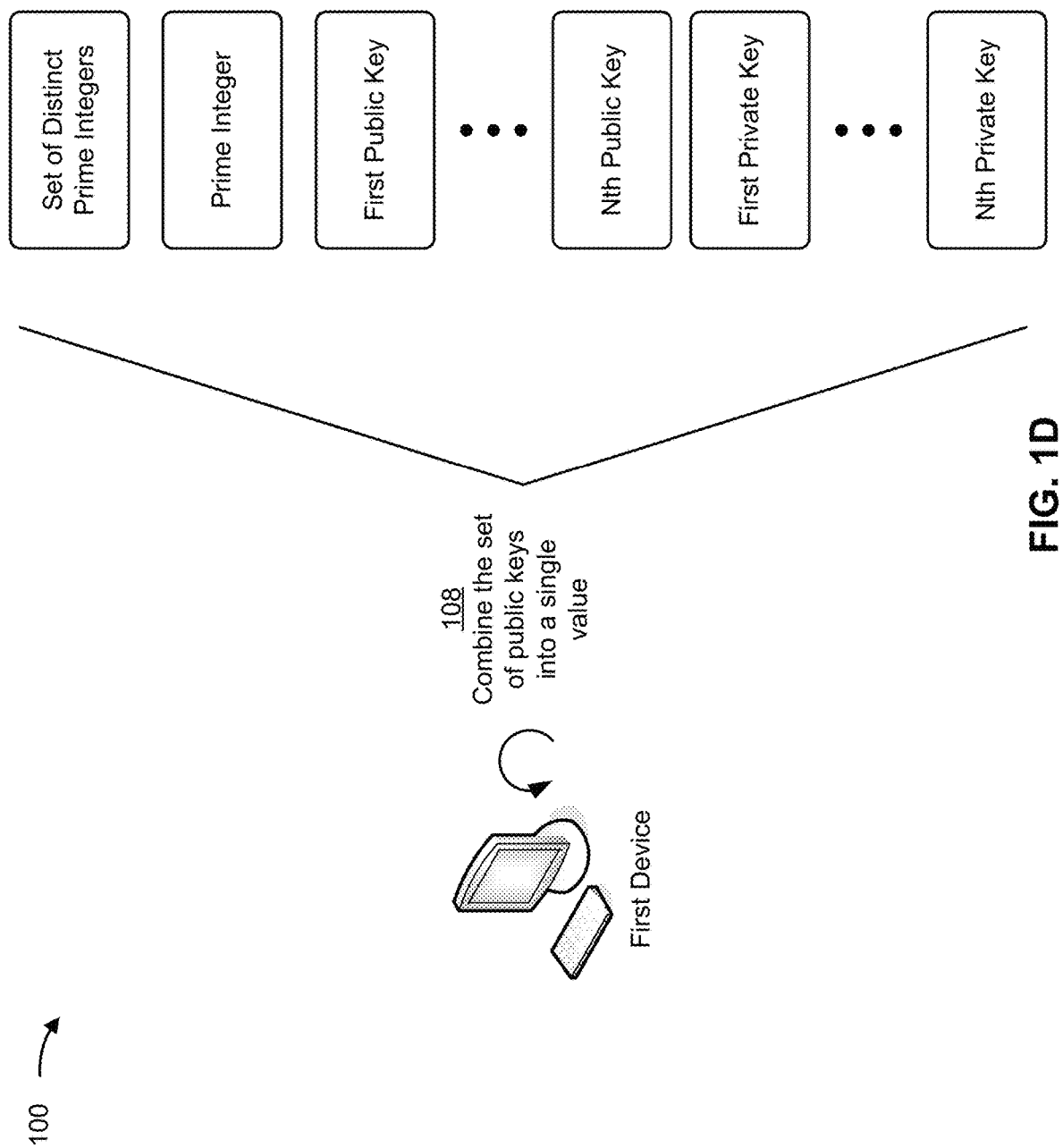

As shown in FIG. 1D, and by reference number 108, the first device may combine the set of public keys into a single value. In some implementations, the device may combine the set of public keys into a single value based on the prime integer for the field and the prime integers for the subgroups. In some implementations, the first device may generate the single value to include the public keys, to include information about the public keys that may be used to extract one or more of the public keys by the second device, and/or the like. In some implementations, the device may combine the public keys into the single value y based on Equation 6 or Equation 7, below:

$$y = \Pi_{i=}^{n}(y_i)^{Q/q_i)^{-1} \bmod q_i} \bmod P \quad \text{(Equation 6)}$$

$$x = \Pi_{i=1}^{n}(Q/q_i)((Q/q_i)^{-1}x_i \bmod q_i) \bmod Q, \text{ and } y = g^x \bmod P \quad \text{(Equation 7)}$$

In some implementations, the second device may extract one or more of the public keys $y_i$ from the single value y. The second device may extract the one or more of the public keys $y_i$ based on Equation 8, below.

$$y_j = y^{Q/q_j} \bmod Pq_j \quad \text{(Equation 8)}$$

Figure 1E:
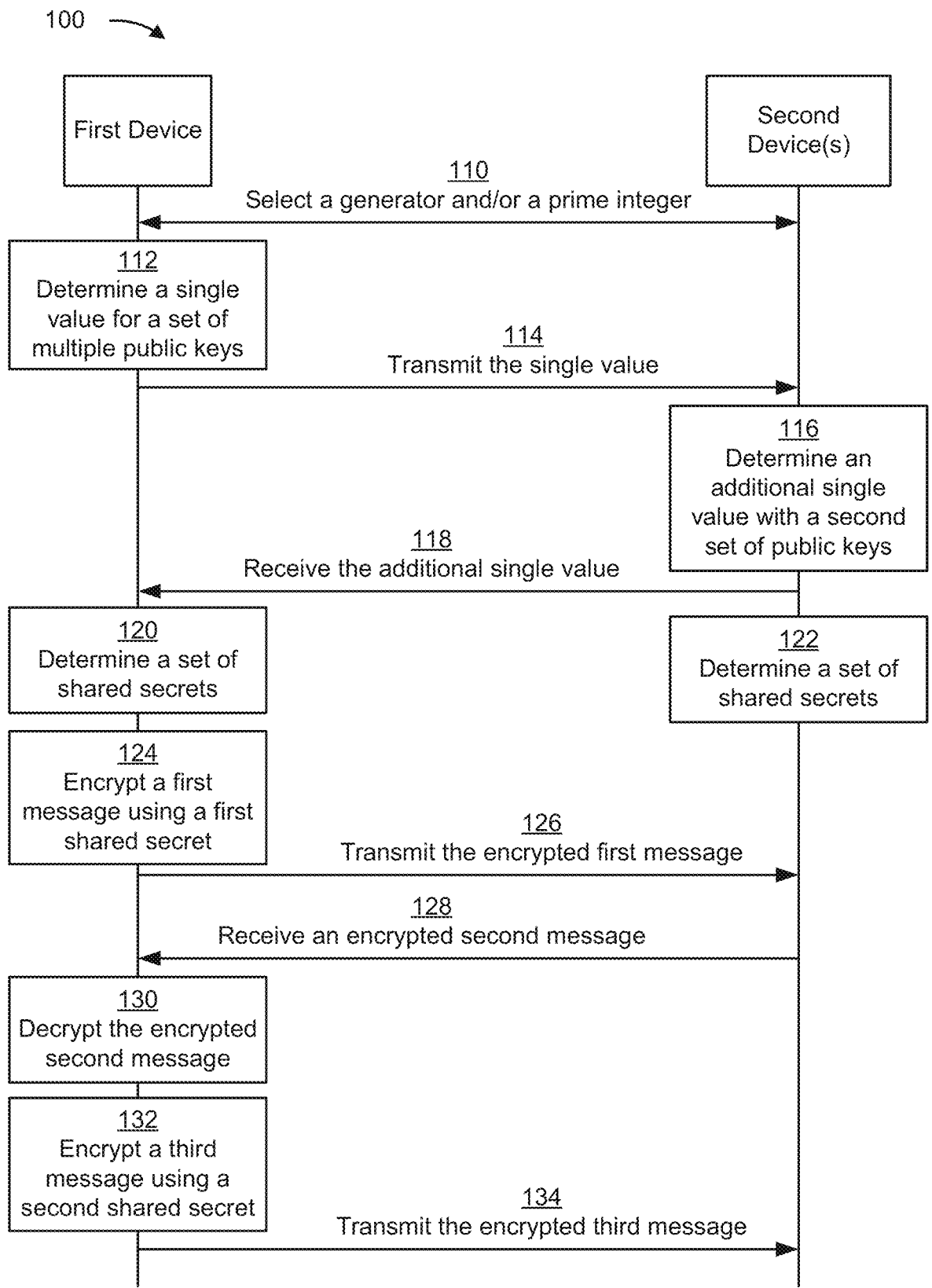

As shown in FIG. 1E, the first device and one or more second devices (e.g., the second device and/or one or more additional devices) may communicate with one another to perform a key exchange and/or to exchange encrypted messages. In some implementations, a process shown in FIG. 1E may include one or more processes described relative to FIGS. 1A-1D.

As shown by reference number 110, the first device and the second device may select a generator and/or a prime integer to use in generating one or more public keys of the set of public keys. In some implementations, the first device may provide the generator and/or the prime integer to the second device. In some implementations, the second device may provide the generator and/or the prime integer to the first device.

As shown by reference number 112, the first device may determine a single value for a set of multiple public keys. In some implementations, the first device may determine the single value based on one or more actions or processes described relative to one or more of reference numbers 102 to 108. As shown by reference number 114, the first device may transmit the single value to the one or more second devices.

As shown by reference number 116, the one or more second devices may determine one or more additional single values for the set of multiple public keys. In some implementations, the one or more second devices may determine the one or more additional single values based on one or more actions or processes described relative to one or more of reference numbers 102 to 108. As shown by reference number 118, the first device may receive the one or more single values from the one or more second devices. In some implementations, a second device of the one or more second devices may transmit a single value to additional devices of the one or more second devices.

As shown by reference number 120, the first device may determine one or more shared secrets, with devices of the one or more second devices, based on the one or more additional single values and the set of secret keys. As shown by reference number 122, the one or more second devices may determine one or more additional shared secrets (e.g., include at least one of the one or more shared secrets), with the first device and/or devices of the one or more second devices, based on the single value from the first device, one or more additional single values from devices of the one or more second devices, and a set of secret keys of the one or more second devices.

As shown by reference number 124, the first device may encrypt a first message using a first shared secret of the one or more shared secrets. In some implementations, the first device may select the first shared secret for encrypting the first message for the second device based on the first shared secret being a first shared secret that is associated with the first device and the second device.

As shown by reference number 128, the first device may receive an encrypted second message from the second device of the one or more second devices. The encrypted second message may be encrypted using the first shared secret. As shown by reference number 130, the first device may decrypt the encrypted second message based on the first shared secret.

In some implementations, the first device may receive an additional encrypted message from a third device of the one or more second devices. The third device may encrypt the additional encrypted message based on an additional shared secret (e.g., of the set of shared secrets). The first device may decrypt the additional encrypted message based on the additional shared secret.

As shown by reference number 132, the first device may encrypt a third message using a second shared secret with the second device. In some implementations, the first device may determine to replace the first shared secret with the second shared secret (e.g., a replacement shared secret) of the set of shared secrets (e.g., based on expiration of a time period). As shown by reference number 134, the first device may transmit the encrypted third message to the second device.

Based on transmitting multiple public keys as a single value and in a single transmission, the device and/or the one or more second devices may conserve computing, communication, and/or network resources that may otherwise be used to individually transmit each of the multiple public keys separately.

Additionally or alternatively, the single value may allow for longer links between devices without compromising security. For example, Diffie-Hellman (DH) key exchanges may be used to establish point-to-point symmetric keys to secure transmission with a symmetric algorithm such as advanced encryption standard (AES). Transmission (link) keys (e.g., shared secret keys derived from public/private key pairs) may have limited life spans that may require replacing the transmission keys. By transmitting multiple public keys in a single transmission, links are able to last longer without requiring additional key exchanges. This may conserve network resources by reducing the quantity of transmissions to establish a link of duration that exceeds the lifespan of a single transmission key.

Additionally or alternatively, if multiple public keys are combined into a single value, a single transmission may enable one device to broadcast keys for multiple second devices. For example, to perform a conventional point-to-point key exchange for five devices on a network, 20 modulo P integers would need to be transmitted on the network to establish each link between the five devices. By enabling each of the five devices to transmit multiple public keys in a single transmission, the key exchanges may be able to be completed in four or five transmissions. This conserves network resources that may instead be used to communicate data or other information.

As indicated above, FIGS. 1A-1E are provided as one or more examples. Other examples may differ from what is described with regard to FIGS. 1A-1E. The number and arrangement of devices shown in FIGS. 1A-1E are provided as an example. In practice, there may be additional devices, fewer devices, different devices, or differently arranged than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Below is an example of an implementation of one or more examples of FIGS. 1A-1E.

A prime P may be generated using with three prime subgroups, each 10 bits in size. Hexadecimal representations of P and the three prime subgroups may be $$P=0xad2955119b7620e873b1b$$

$$q_1=0x25f$$

$$q_2=0x241$$

$$q_3=0x22d:$$

A generator g of the subgroup of order Q may be $g=0x35f68420b4312d1f15b9d$, with the individual generators being:

$$g_1=0x736aaa1871c9e22164c63$$

$$g_2=0x5b858ba3e8f4c9ed47909$$

$$g_3=0xf5807c2e75b3d1a0f96f$$

If the secret keys are: $x1=0x1f2$; $x2=0x124$; $x3=0xa7$ then:

$$x \equiv 0x4e76d(0x680x1f2 \bmod 0x25f)$$

$$+0x528b3(0x12d0x124 \bmod 0x241)$$

$$+0x5581f(0xab0xa7 \bmod 0x22d) \bmod 0xba0bb73$$

$$\equiv 0x4e76d0xc5+0x528b30xbc+ \\ 0x5581f0x96 \bmod 0xba0bb73$$

$$\equiv 3x3c616e1+0x3c9e374+0x321a22a$$

$$\equiv 0xab19c7f \bmod Q$$

$$(y_1 \equiv g_1^{x1}) \equiv 0x5e21823facf2971f84a3f \bmod P$$

$$(y_s \equiv g_2^{x2}) \equiv 0x9164cf95d950d400636b2 \bmod P$$

$$(y_3 \equiv g^x) \equiv 0x2c5f6009c8777881372cd \bmod P$$

$$(y \equiv g^x) \equiv y_1^{0x68} \cdot y_2^{0x122} \cdot y_3^{0xab}$$

$$\equiv 0x80cfa68c0e4de5873ff86 \bmod P$$

In the other direction (e.g., to extract public keys $y_1$, $y_2$, and/or $y_3$), the first device or a second device may use $y_i \equiv y^{Q/q_i} \bmod P$.

In this way, three public DH keys can be exchanged with the transmission of y. After a device generates separate $x_i$, values as private keys, the single value y may be generated and transmitted to another device. A recipient of the single value y may extract one or more of the individual $y_i$ values and raise each of the $y_i$ values using the separate $x_j$ values to create three separate DH shared secrets.

Figure 2:
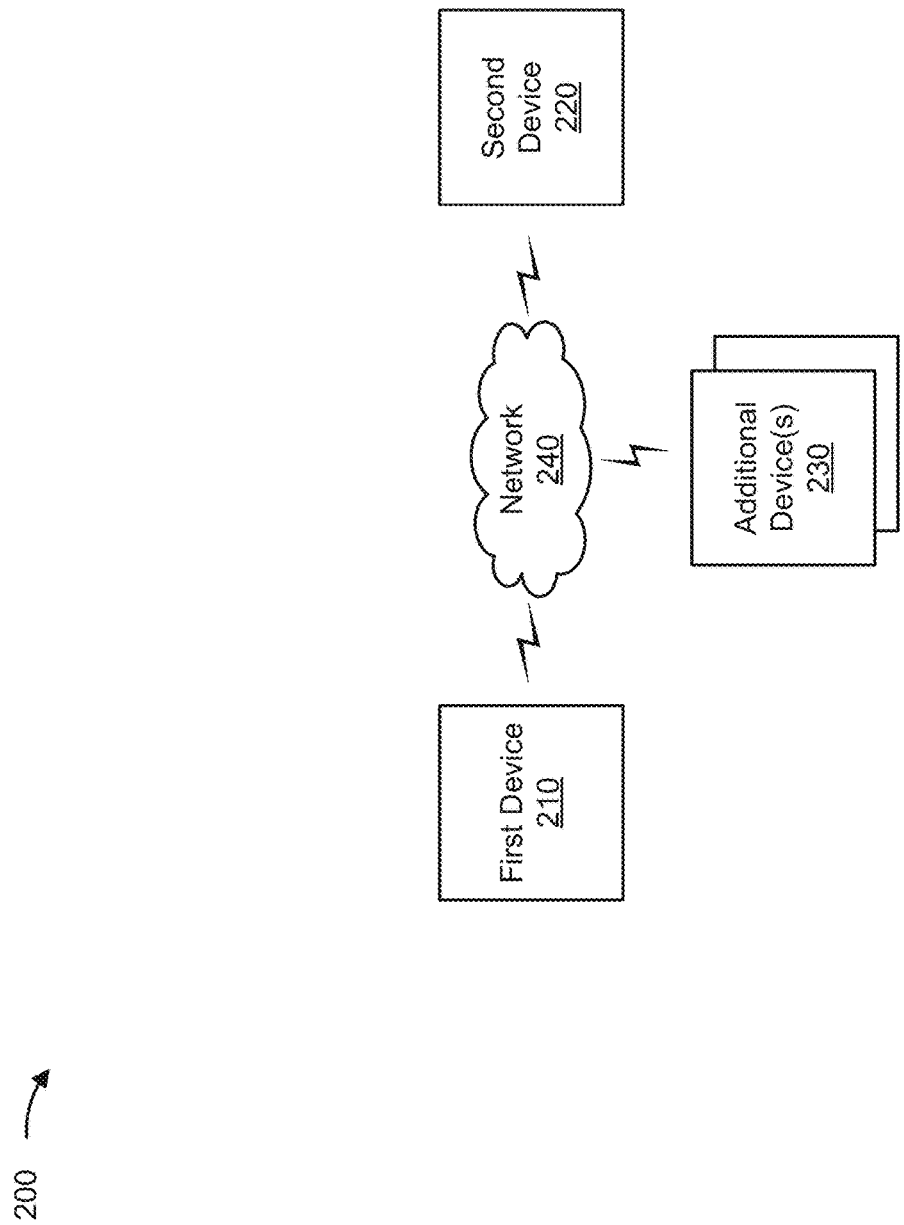
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a first device 210, a second device 220, one or more additional devices 230, and a network 240. Devices of environment 200 may interconnect via wired connections, wireless connections, or a combination of wired and wireless connections.

The first device 210 includes one or more devices capable of receiving, generating, storing, processing, and/or providing information associated with key exchanges, encrypting and/or decrypting communications, and/or the like. The first device 210 may include a communication device and/or a computing device. For example, the first device 210 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The first device 210 may communicate with one or more other devices of environment 200, as described elsewhere herein.

The second device 220 includes one or more devices capable of receiving, generating, storing, processing, and/or providing information associated with key exchanges, encrypting and/or decrypting communications, and/or the like. The second device 220 may include a communication device and/or a computing device. For example, the second device 220 may include a wireless communication device, a UE, a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an IoT device, or a similar type of device. The second device 220 may communicate with one or more other devices of environment 200, as described elsewhere herein.

The one or more additional devices 230 include one or more devices capable of receiving, generating, storing, processing, and/or providing information associated with key exchanges, encrypting and/or decrypting communications, and/or the like. The one or more additional devices 230 may include a communication device and/or a computing device. For example, the one or more additional devices 230 may include a wireless communication device, a UE, a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an IoT device, or a similar type of device. The one or more additional devices 230 may communicate with one or more other devices of environment 200, as described elsewhere herein.

The network 240 includes one or more wired and/or wireless networks. For example, the network 240 may include a cellular network (e.g., a fifth generation (5G) network, a fourth generation (4G) network, a long-term evolution (LTE) network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 240 enables communication among the devices of environment 200.

In some implementations, the first device 210 may transmit a first public key to the second device 220 and/or the one or more additional devices 230 via the network 240. The second device 220 may transmit a second public key to the first device 210 and/or the one or more additional devices 230. The first device 210 and the second device 220 may determine a shared secret (e.g., a shared key) based on the first public key and the second public key. The first device 210 and/or the second device 220 may determine one or more additional shared secrets based on one or more additional public keys. The first device 210, the second device 220, and/or the one or more additional devices 230 may encrypt data, communicate encrypted data, and/or decrypt data based on shared secrets.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
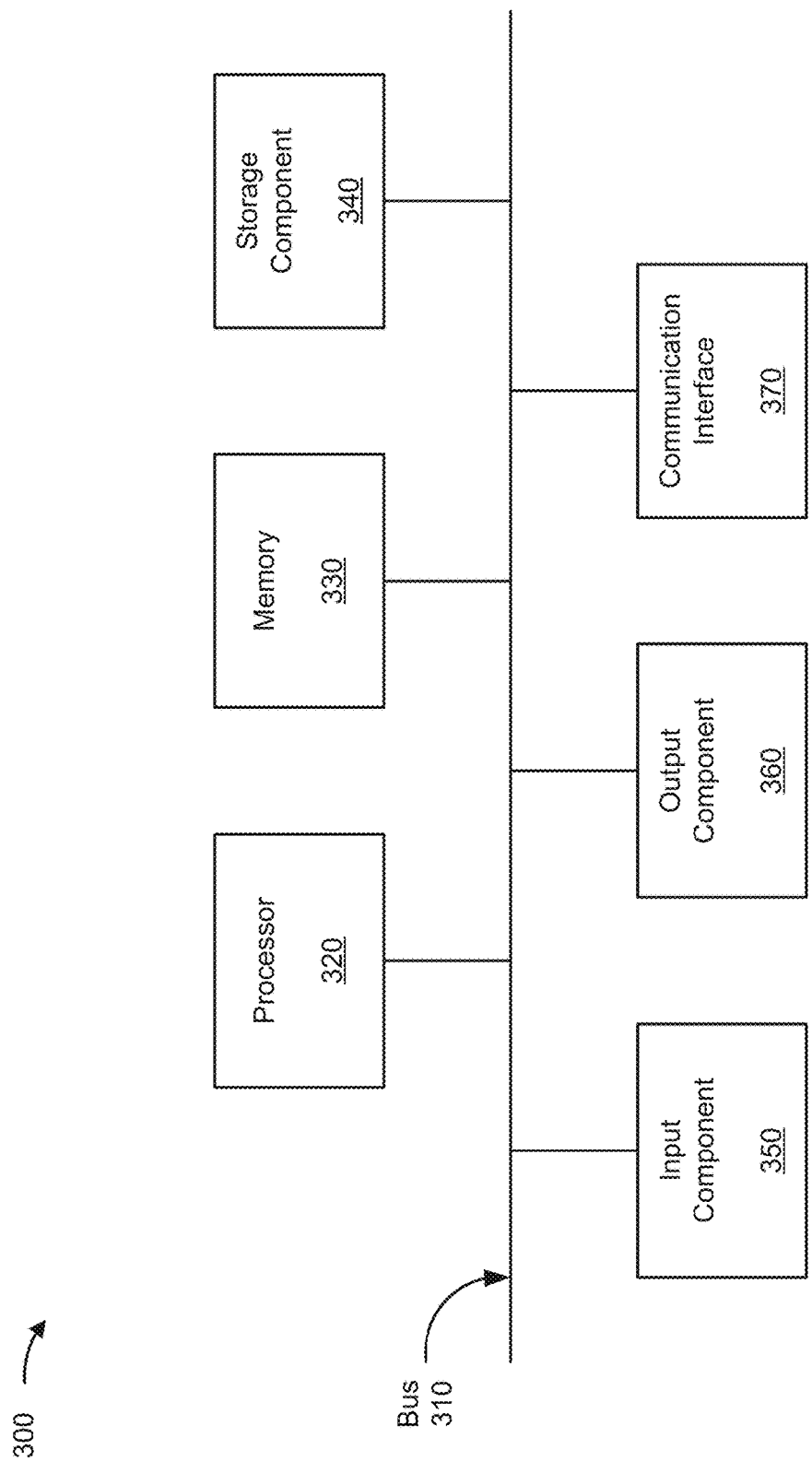
FIG. 3 is a diagram of example components of one or more devices of FIG. 2.

FIG. 3 is a diagram of example components of a device 300. Device 300 may correspond to the first device 210, the second device 220, and/or the additional devices 230. In some implementations, the first device 210, the second device 220, and/or the additional devices 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
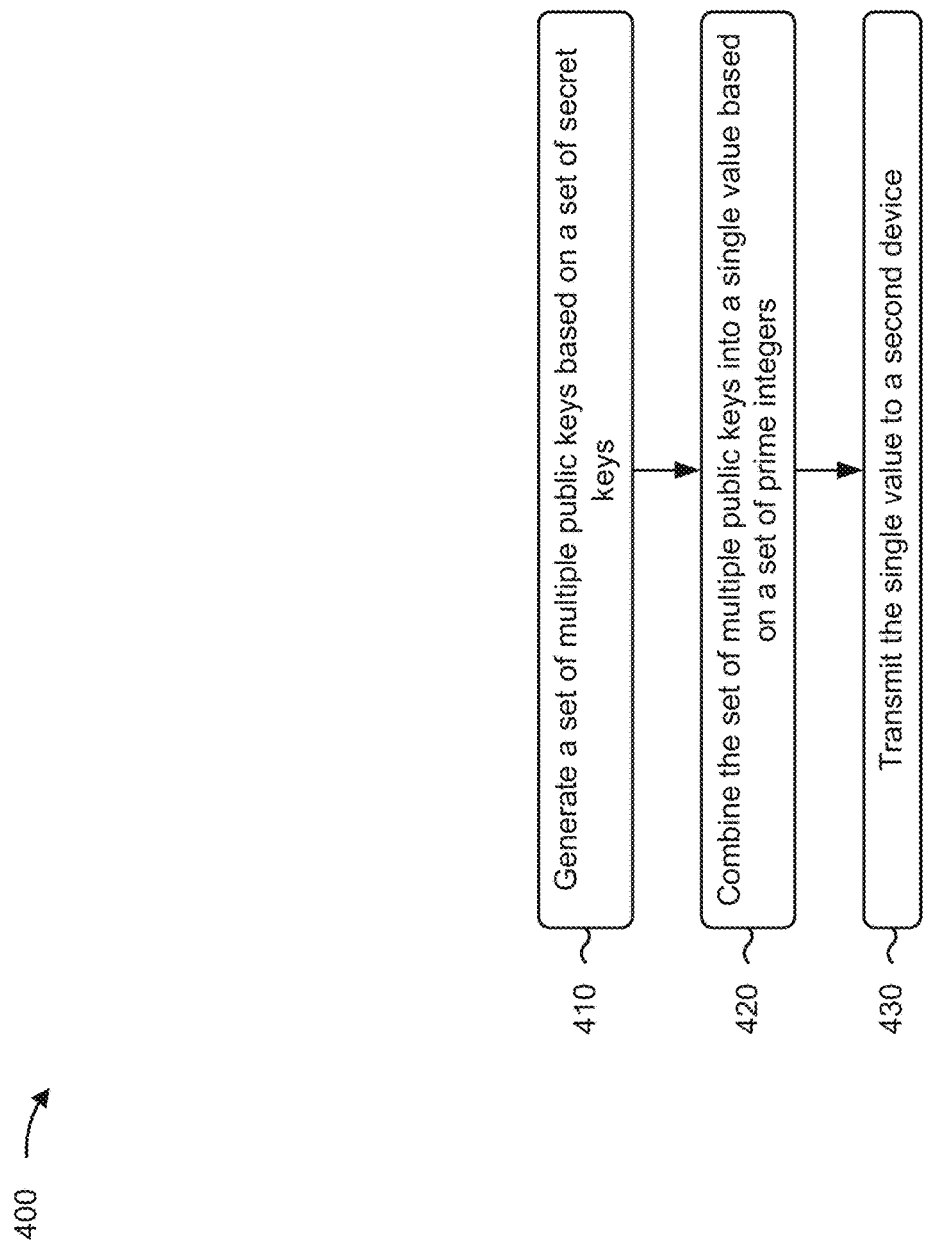
FIGS. 4-6 are flow charts of example processes relating to multi-key exchange.

FIG. 4 is a flow chart of an example process 400 for multi-key exchange. In some implementations, one or more process blocks of FIG. 4 may be performed by a first device (e.g., first device 210). In some implementations, one or more process blocks of FIG. 4 may be performed by another device or a group of devices separate from or including the first device, such as a second device (e.g., second device 220), one or more additional devices (e.g., additional device(s) 230), and/or the like.

As shown in FIG. 4, process 400 may include generating a set of multiple public keys based on a set of secret keys (block 410). For example, the first device (e.g., using processor 320, memory 330, storage component 340, input component 350, output component 360, communication interface 370, and/or the like) may generate a set of multiple public keys based on a set of secret keys, as described above.

As further shown in FIG. 4, process 400 may include combining the set of multiple public keys into a single value based on a set of prime integers (block 420). For example, the first device (e.g., using processor 320, memory 330, storage component 340, input component 350, output component 360, communication interface 370, and/or the like) may combine the set of multiple public keys into a single value based on a set of prime integers, as described above.

As further shown in FIG. 4, process 400 may include transmitting the single value to a second device (block 430). For example, the first device (e.g., using processor 320, memory 330, storage component 340, input component 350, output component 360, communication interface 370, and/or the like) may transmit the single value to a second device, as described above.

Process 400 may include additional implementations, such as any single implementation or any combination of implementations described below and/or in connection with one or more other processes described elsewhere herein.

In a first implementation, process 400 includes receiving an additional single value from the second device; and determining a set of shared secrets based on the additional single value and the set of secret keys.

In a second implementation, alone or in combination with the first implementation, process 400 includes encrypting, based on a shared secret of the set of shared secrets, a message for the second device; and transmitting the message to the second device.

In a third implementation, alone or in combination with one or more of the first and second implementations, process 400 includes determining to replace the shared secret with a replacement shared secret of the set of shared secrets; encrypting, based on the replacement shared secret, an additional message for the second device; and transmitting the additional message to the second device.

In a fourth implementation, alone or in combination with one or more of the first through third implementations, process 400 includes receiving, from the second device, a message that is encrypted based on a shared secret of the set of shared secrets; and decrypting the message based on the shared secret.

In a fifth implementation, alone or in combination with one or more of the first through fourth implementations, process 400 includes transmitting the single value to a third device; receiving a second single value from the second device; receiving a third single value from the third device; determining a first shared secret with the second device based on the second single value and the set of secret keys; and determining a second shared secret with the third device based on the third single value and the set of secret keys.

In a sixth implementation, alone or in combination with one or more of the first through fifth implementations, process 400 includes generating the set of prime integers for a key exchange protocol.

In a seventh implementation, alone or in combination with one or more of the first through sixth implementations, process 400 includes selecting, in cooperation with the second device, a generator for generating the set of multiple public keys based on the set of secret keys; and selecting, in cooperation with the second device, the set of prime integers.

In an eighth implementation, alone or in combination with one or more of the first through seventh implementations, process 400 includes determining a set of components of a generator for generating the set of multiple public keys based on the set of secret keys, wherein the set of components is based on the generator and the set of prime integers.

In a ninth implementation, alone or in combination with one or more of the first through eighth implementations, the set of multiple public keys is based on exponentiations of the set of components of the generator by the set of secret keys.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
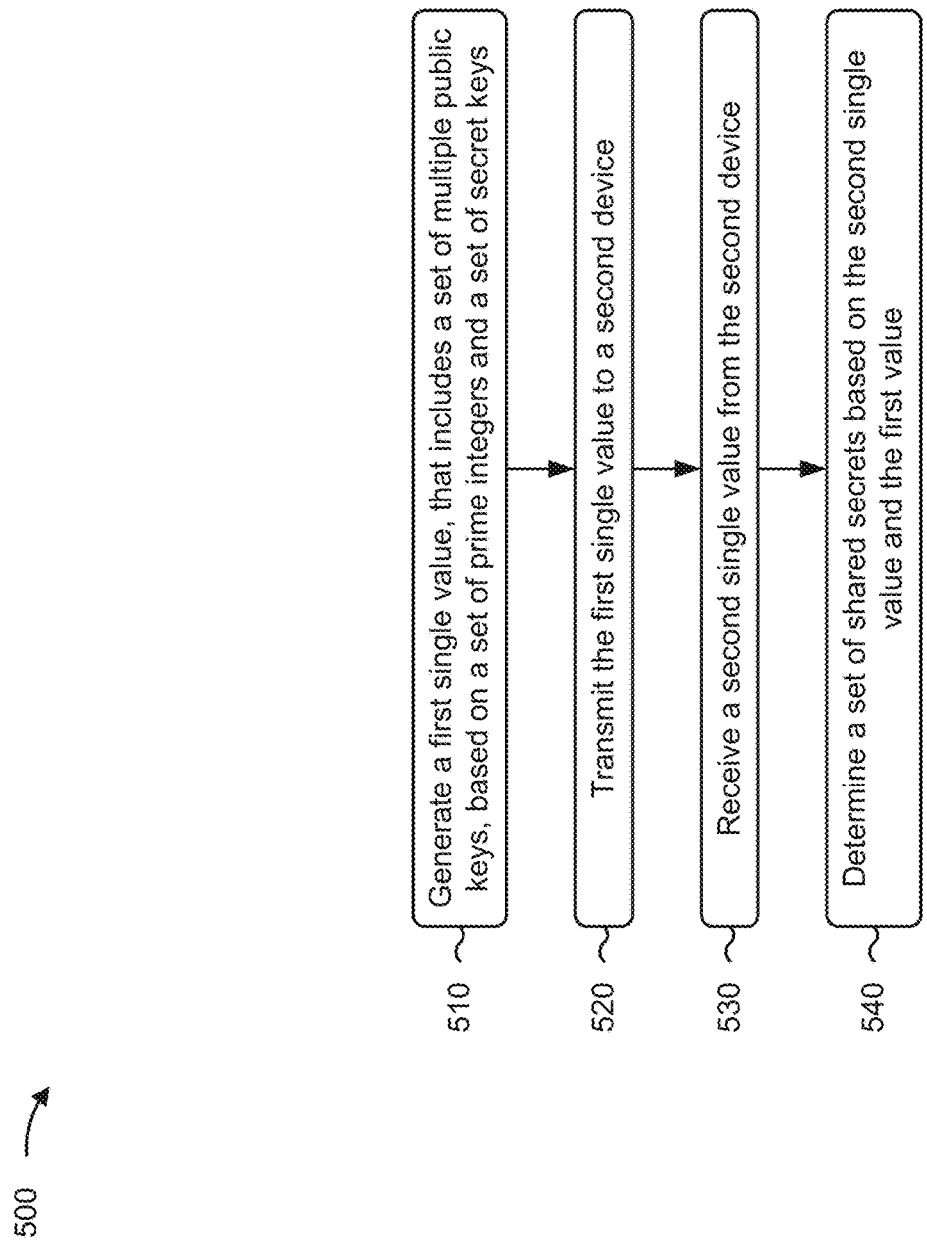

FIG. 5 is a flow chart of an example process 500 for multi-key exchange. In some implementations, one or more process blocks of FIG. 5 may be performed by a first device (e.g., first device 210). In some implementations, one or more process blocks of FIG. 5 may be performed by another device or a group of devices separate from or including the first device, such as a second device (e.g., second device 220), one or more additional devices (e.g., additional device(s) 230), and/or the like.

As shown in FIG. 5, process 500 may include generating a first single value, that includes a set of multiple public keys, based on a set of prime integers and a set of secret keys (block 510). For example, the first device (e.g., using processor 320, memory 330, storage component 340, input component 350, output component 360, communication interface 370, and/or the like) may generate a first single value, that includes a set of multiple public keys, based on a set of prime integers and a set of secret keys, as described above.

As further shown in FIG. 5, process 500 may include transmitting the first single value to a second device (block 520). For example, the first device (e.g., using processor 320, memory 330, storage component 340, input component 350, output component 360, communication interface 370, and/or the like) may transmit the first single value to a second device, as described above.

As further shown in FIG. 5, process 500 may include receiving a second single value from the second device (block 530). For example, the first device (e.g., using processor 320, memory 330, storage component 340, input component 350, output component 360, communication interface 370, and/or the like) may receive a second single value from the second device, as described above.

As further shown in FIG. 5, process 500 may include determining a set of shared secrets based on the second single value and the first value (block 540). For example, the first device (e.g., using processor 320, memory 330, storage component 340, input component 350, output component 360, communication interface 370, and/or the like) may determine a set of shared secrets based on the second single value and the first value, as described above.

Process 500 may include additional implementations, such as any single implementation or any combination of implementations described below and/or in connection with one or more other processes described elsewhere herein.

In a first implementation, process 500 includes encrypting, based on a shared secret of the set of shared secrets, a message for the second device; and transmitting the message to the second device.

In a second implementation, alone or in combination with the first implementation, process 500 includes determining to replace the shared secret with a replacement shared secret of the set of shared secrets; encrypting, based on the replacement shared secret, an additional message for the second device; and transmitting the additional message to the second device.

In a third implementation, alone or in combination with one or more of the first and second implementations, process 500 includes receiving, from the second device, a message that is encrypted based on a shared secret of the set of shared secrets; and decrypt the message is basing on the shared secret.

In a fourth implementation, alone or in combination with one or more of the first through third implementations, process 500 includes transmitting the first single value to a third device; receiving a third single value from the third device; determining a first shared secret with the second device based on the second single value and the set of secret keys; and determining a second shared secret with the third device based on the third single value and the set of secret keys.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
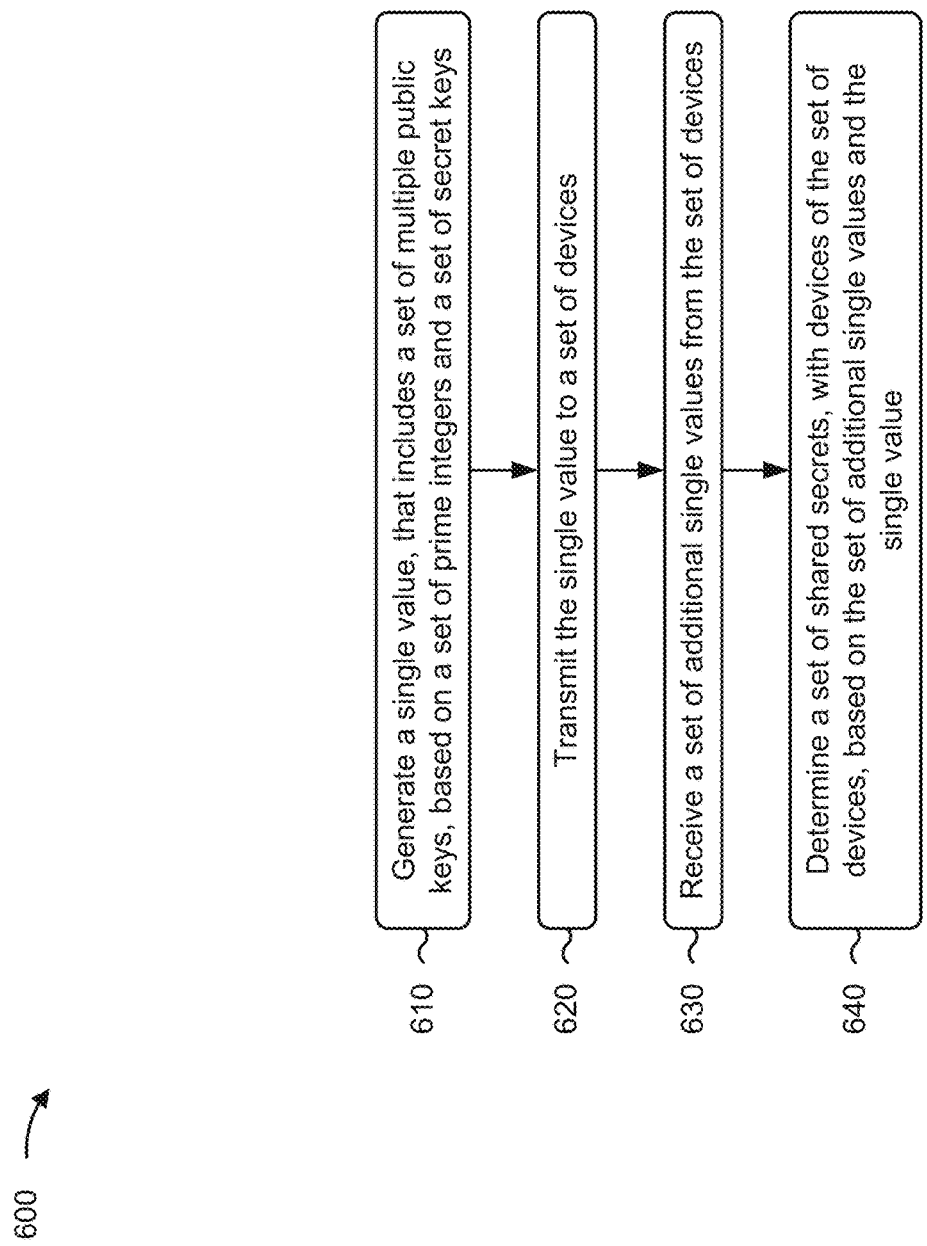

FIG. 6 is a flow chart of an example process 600 for multi-key exchange. In some implementations, one or more process blocks of FIG. 6 may be performed by a first device (e.g., first device 210). In some implementations, one or more process blocks of FIG. 6 may be performed by another device or a group of devices separate from or including the first device, such as a second device (e.g., second device 220), one or more additional devices (e.g., additional device(s) 230), and/or the like.

As shown in FIG. 6, process 600 may include generating a single value, that includes a set of multiple public keys, based on a set of prime integers and a set of secret keys (block 610). For example, the first device (e.g., using processor 320, memory 330, storage component 340, input component 350, output component 360, communication interface 370, and/or the like) may generate a single value, that includes a set of multiple public keys, based on a set of prime integers and a set of secret keys, as described above.

As further shown in FIG. 6, process 600 may include transmitting the single value to a set of devices (block 620). For example, the first device (e.g., using processor 320, memory 330, storage component 340, input component 350, output component 360, communication interface 370, and/or the like) may transmit the single value to a set of devices, as described above.

As further shown in FIG. 6, process 600 may include receiving a set of additional single values from the set of devices (block 630). For example, the first device (e.g., using processor 320, memory 330, storage component 340, input component 350, output component 360, communication interface 370, and/or the like) may receive a set of additional single values from the set of devices, as described above.

As further shown in FIG. 6, process 600 may include determining a set of shared secrets, with devices of the set of devices, based on the set of additional single values and the single value (block 640). For example, the first device (e.g., using processor 320, memory 330, storage component 340, input component 350, output component 360, communication interface 370, and/or the like) may determine a set of shared secrets, with devices of the set of devices, based on the set of additional single values and the single value, as described above.

Process 600 may include additional implementations, such as any single implementation or any combination of implementations described below and/or in connection with one or more other processes described elsewhere herein.

In a first implementation, process 600 includes encrypting, based on a first shared secret of the set of shared secrets, a first message for a first device of the set of devices; encrypting, based on a second shared secret of the set of shared secrets, a second message for a second device of the set of devices; and transmitting the first message to the first device and the second message to the second device.

In a second implementation, alone or in combination with the first implementation, process 600 includes receiving, from a first device of the set of devices, a first message that is encrypted based on a first shared secret of the set of shared secrets; receiving, from a second device of the set of devices, a second message that is encrypted based on a second shared secret of the set of shared secrets; and decrypting the first is messaging based on the first shared secret and the second message based on the second shared secret.

In a third implementation, alone or in combination with one or more of the first and second implementations, process 600 includes determining a first shared secret with a first device, of the set of devices, based on a first additional single value, of the set of additional single values, and the set of secret keys; and determining a second shared secret with a second device, of the set of devices, based on a second additional single value, of the set of additional single values, and the set of secret keys.

In a fourth implementation, alone or in combination with one or more of the first through third implementations, process 600 includes selecting, in cooperation with one or more of the set of devices, a generator for generating the set of multiple public keys based on the set of secret keys; and selecting, in cooperation with the one or more of the set of devices, the set of prime integers.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
generating, by a first device, a set of multiple public keys based on a set of secret keys;
combining, by the first device, the set of multiple public keys into a single value based on a set of prime integers,
wherein the set of prime integers includes a prime integer associated with a field and a prime integer associated with a subgroup; and
transmitting, by the first device, the single value to a second device,
wherein the single value is to include information about the set of the multiple public keys, and
wherein only the single value is used to extract one or more of the set of the multiple public keys by the second device.

2. The method of claim 1, further comprising:
receiving an additional single value from the second device; and
determining a set of shared secrets based on the additional single value and the set of secret keys.

3. The method of claim 2, further comprising:
encrypting, based on a shared secret of the set of shared secrets, a message for the second device; and
transmitting the message to the second device.

4. The method of claim 3, further comprising:
determining to replace the shared secret with a replacement shared secret of the set of shared secrets;
encrypting, based on the replacement shared secret, an additional message for the second device; and
transmitting the additional message to the second device.

5. The method of claim 2, further comprising:
receiving, from the second device, a message that is encrypted based on a shared secret of the set of shared secrets; and
decrypting the message based on the shared secret.

6. The method of claim 1, further comprising:
transmitting the single value to a third device;
receiving a second single value from the second device;
receiving a third single value from the third device;
determining a first shared secret with the second device based on the second single value and the set of secret keys; and
determining a second shared secret with the third device based on the third single value and the set of secret keys.

7. The method of claim 1, further comprising:
generating the set of prime integers for a key exchange protocol.

8. The method of claim 1, further comprising:
selecting, in cooperation with the second device, a generator for generating the set of multiple public keys based on the set of secret keys; and
selecting, in cooperation with the second device, the set of prime integers.

9. The method of claim 1, further comprising:
determining a set of components of a generator for generating the set of multiple public keys based on the set of secret keys,
wherein the set of components are based on the generator and the set of prime integers.

10. The method of claim 9, wherein the set of multiple public keys is based on exponentiations of the set of components of the generator by the set of secret keys.

11. A first device, comprising:
one or more memories; and
one or more processors to:
generate a first single value, that includes a set of multiple public keys, based on a set of prime integers and a set of secret keys,
wherein the set of prime integers includes a prime integer associated with a field and a prime integer associated with a subgroup;
transmit the first single value to a second device,
wherein the first single value is to include information about the set of the multiple public keys, and
wherein only the first single value is used to extract one or more of the set of the multiple public keys by the second device;
receive a second single value from the second device; and
determine a set of shared secrets based on the second single value and the first single value.

12. The first device of claim 11, wherein the one or more processors are further to:
encrypt, based on a shared secret of the set of shared secrets, a message for the second device; and
transmit the message to the second device.

13. The first device of claim 12, wherein the one or more processors are further to:
   determine to replace the shared secret with a replacement shared secret of the set of shared secrets;
   encrypt, based on the replacement shared secret, an additional message for the second device; and
   transmit the additional message to the second device.

14. The first device of claim 11, wherein the one or more processors are further to:
   receive, from the second device, a message that is encrypted based on a shared secret of the set of shared secrets; and
   decrypt the message based on the shared secret.

15. The first device of claim 11, wherein the one or more processors are further to:
   transmit the first single value to a third device;
   receive a third single value from the third device;
   determine a first shared secret with the second device based on the second single value and the set of secret keys; and
   determine a second shared secret with the third device based on the third single value and the set of secret keys.

16. A non-transitory computer-readable medium storing instructions, the instructions comprising:
   one or more instructions that, when executed by one or more processors, cause the one or more processors to:
   generate a single value, that includes a set of multiple public keys, based on a set of prime integers and a set of secret keys,
      wherein the set of prime integers includes a prime integer associated with a field and a prime integer associated with a subgroup;
   transmit the single value to a set of devices,
      wherein the single value is to include information about the set of the multiple public keys, and
      wherein only the single value is used to extract one or more of the set of the multiple public keys by the set of devices;
   receive a set of additional single values from the set of devices; and
   determine a set of shared secrets, with devices of the set of devices, based on the set of additional single values and the single value.

17. The non-transitory computer-readable medium of claim 16, wherein the one or more instructions, when executed by the one or more processors, further cause the one or more processors to:
   encrypt, based on a first shared secret of the set of shared secrets, a first message for a first device of the set of devices;
   encrypt, based on a second shared secret of the set of shared secrets, a second message for a second device of the set of devices; and
   transmit the first message to the first device and the second message to the second device.

18. The non-transitory computer-readable medium of claim 16, wherein the one or more instructions, when executed by the one or more processors, further cause the one or more processors to:
   receive, from a first device of the set of devices, a first message that is encrypted based on a first shared secret of the set of shared secrets;
   receive, from a second device of the set of devices, a second message that is encrypted based on a second shared secret of the set of shared secrets; and
   decrypt the first message based on the first shared secret and the second message based on the second shared secret.

19. The non-transitory computer-readable medium of claim 16, wherein the one or more instructions, when executed by the one or more processors, further cause the one or more processors to:
   determine a first shared secret with a first device, of the set of devices, based on a first additional single value, of the set of additional single values, and the set of secret keys; and
   determine a second shared secret with a second device, of the set of devices, based on a second additional single value, of the set of additional single values, and the set of secret keys.

20. The non-transitory computer-readable medium of claim 16, wherein the one or more instructions, when executed by the one or more processors, further cause the one or more processors to:
   select, in cooperation with one or more of the set of devices, a generator for generating the set of multiple public keys based on the set of secret keys; and
   select, in cooperation with the one or more of the set of devices, the set of prime integers.

* * * * *